United States Patent [19]

Barthelemy

[11] 4,412,460

[45] Nov. 1, 1983

[54] TWO-SPEED COUPLINGS

[75] Inventor: André J. Barthelemy, St. Remy-les-Chevreuse, France

[73] Assignees: S.A. Automobiles Citroen; Societe dite Automobiles Peugeot, both of Paris, France

[21] Appl. No.: 187,162

[22] Filed: Sep. 15, 1980

[30] Foreign Application Priority Data

Jun. 23, 1980 [FR] France ............................... 80 14282

[51] Int. Cl.³ .......................... F16H 3/74; F16H 5/46; F16D 43/16
[52] U.S. Cl. ............................. 74/752 E; 192/104 C
[58] Field of Search ................... 74/752 E; 192/104 C

[56] References Cited

U.S. PATENT DOCUMENTS 3,702,084  11/1972  Kepple et al. .................... 74/752 E Primary Examiner—Allan D. Herrmann
Attorney, Agent, or Firm—Karl F. Ross; Herbert Dubno

[57] ABSTRACT

A two-speed drive coupling for connecting an engine of a motor vehicle with an accessory such as an alternator. The coupling comprises a driving member and a driven member with a sun gear being mounted on the driven member. A planet gear wheel holder is carried on the driving member and carries planet gear wheels which mesh with the sun gear and with a crown gear locked against rotation and surrounding the sun gear. A unidirectional coupling is provided between the driving member and the driven member and a centrifugal clutch between the driving member and the holder. At low speeds of the driving member, the clutch is engaged and the driven member is rotated at a greater speed than the driving member through the planet gear wheels and the sun gear. At higher speeds of the driving member, the clutch disengages and the driven member is rotated directly by the driving member through the unidirectional coupling.

5 Claims, 4 Drawing Figures

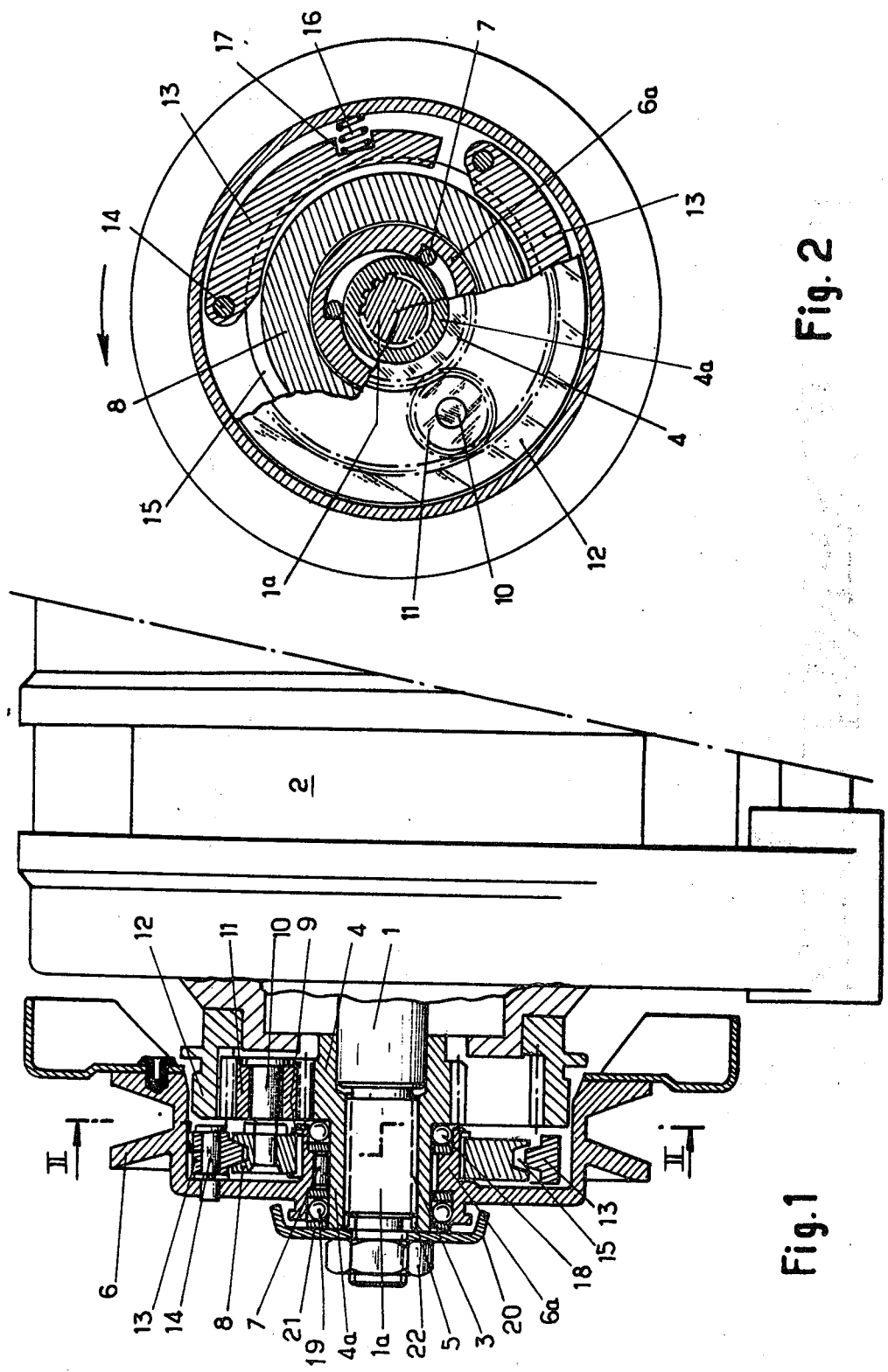

TWO-SPEED COUPLINGS

BACKGROUND TO THE INVENTION

1. Field of the Invention

The present invention relates to devices adapted to drive motor vehicle accessories, such as a fan or a water pump or an alternator, from the engine of the vehicle.

The engine of a vehicle runs at a speed which varies within wide limits. It is preferable, however, to maintain those accessories of the vehicle which are driven by said engine, in particular the alternator, at a relatively stable speed. In particular, it is preferable to maintain them at a substantial speed at low engine speeds while avoiding excess speeds at high engine speeds.

2. Description of the Prior Art

It has previously been proposed to provide a driving device for said accessories in which two drive ratios are possible between the driving unit and the driven unit, so that the drive ratio is higher when the driving shaft rotates at a low rate than when it rotates at a high rate.

In particular, such driving devices are known comprising a gear system and control means comprising gears, the system being sensitive to the rotational speed of the driving unit and permitting drive of the driven unit either at an overgeared speed through the gear system, or at the speed of the driving unit through an unidirectional coupling. Such previously proposed devices are relatively complicated and generally require an electro-magnetically driven gear.

OBJECT OF THE INVENTION

The present invention has for its object a driving device of the above type which is entirely mechanically controlled.

SUMMARY OF THE INVENTION

According to a first aspect of the invention, there is provided a driving device for motor vehicle accessories and comprising a driving member, a driven member, a crown gear fixed against rotation, a sun gear fixedly mounted on the driven member, a planet gear wheel holder capable of rotation relatively to the driving member and the sun gear, at least two planet gear wheels rotatably mounted on the planet gear wheel holder and in meshing engagement with the crown gear wheel and the sun gear, a unidirectional coupling between the driving and driven members, a centrifugal clutch arranged between the driving member and the planet gear wheel holder, whereby, at rotational speeds of the driving member below a predetermined rotational speed determined by the centrifugal clutch, the clutch engages the planet gear wheel holder to transmit drive from the driving member to the driven member through the planet gear wheels and the sun gear to rotate the driven member at a higher rotational speed than the driving member and, at rotational speeds of the driving member above said predetermined rotational speed, the clutch disengages to permit direct transmission of drive from the driving member to the driven member through the unidirectional coupling to rotate the driven member at the same rotational speed as the driving member.

According to a second aspect of the invention, there is provided a two-speed coupling comprising a driving member, a centrifugal clutch mounted on the driving member and movable into and out of an engaged position at predetermined speeds of the driven member, a planet gear wheel holder rotatable relatively to the driving member but locked to the driving member by the centrifugal clutch when the centrifugal clutch is in the engaged position, planet gear wheels rotatably mounted on the planet gear wheel holder, a fixed crown gear in mesh with the planet gear wheels, a driven member, a sun gear mounted on the driven member and in mesh with the planet gear wheels and a unidirectional coupling between the driving member and the driven member, whereby, with the clutch engaged, the driven member is rotated by the planet gear wheels faster than the driving member and, with the clutch disengaged, the driven member is rotated directly by the driving member through the unidirectional coupling.

The following is a more detailed description of two embodiments of the invention, by way of example, with reference to the accompanying drawing.

SPECIFIC DESCRIPTION

FIG. 1 is an axial cross-section of a first embodiment of a driving device for motor vehicle accessories, FIG. 2 is a cross-section on the line II—II of FIG. 1, FIG. 3 is an axial cross-section of a second embodiment of a driving device for motor vehicle accessories, and FIG. 4 is a cross-section on the line IV—IV of FIG. 3.

DESCRIPTION OF THE PREFERRED EMBODIMENTS

Figure 4:
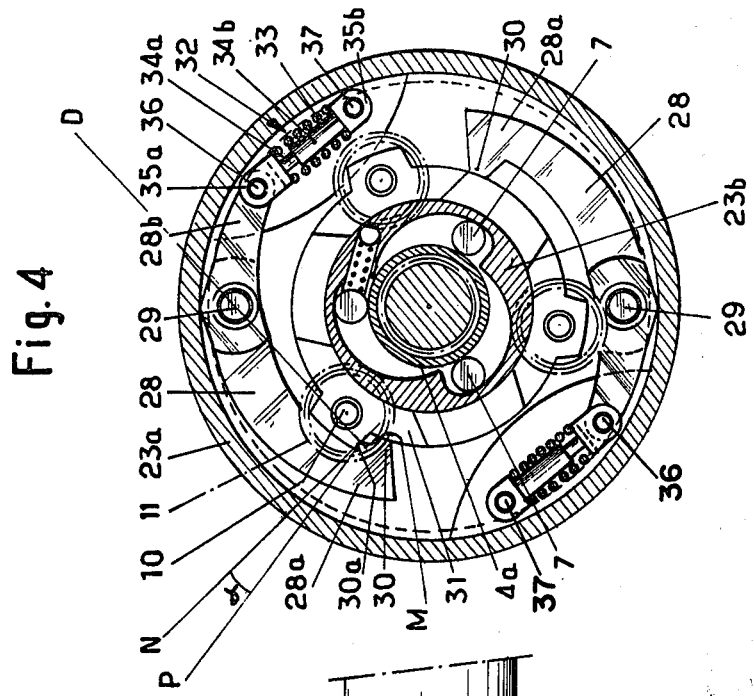

Referring first to FIGS. 1 and 2, the first embodiment of the device comprises a driven shaft 1 which is, in this case, the input shaft of an alternator 2. An end 1a of the shaft 1 is provided with splines 3 which engage with corresponding splines 5 on a sleeve 4a of a sun gear 4. A driving pulley 6 is provided which is connected via a belt (not shown) to a pulley mounted for rotation with a crankshaft (not shown) of an internal combustion engine (not shown). The driving pulley 6 has a bearing surface 6a which is mounted on the sleeve 4a of the sun gear 4 by means of a free wheel 7 including locking rollers. The free wheel 7 permits the free rotation of the sun gear 4 relative to the pulley in the direction of the arrow f (FIG. 2), which is the normal direction of rotation of the pulley. A planet gear wheel holder 8 is rotatably mounted on the pulley 6 and is held in position by a circlip 9. The planet gear wheel holder includes shafts 10 upon which respective planet gear wheels 11 are rotatably mounted between the sun gear 4 and a toothed crown 12 solid with the stator of the alternator 1.

A centrifugal clutch is mounted between the driving pulley 6 and the planet gear wheel holder 8. This clutch comprises two counterweights 13 which are pivotably mounted on respective shafts 14 which are carried by the pulley 6 and which are engagable in a converging groove 15 formed in the outer circumference of the planet gear wheel holder 8. A spring 16 located between the inner surface of the pulley 6 and a cavity 17 provided in the counterweight tends to hold the associated counterweight engaged in the groove 15, which locks the planet gear wheel holder 8 to the pulley 6.

Two anti-friction bearings 18 and 19 are provided, one 18 of which is disposed between a radial surface of the sun gear 4 and a radial surface of the bearing surface 6a of the pulley 6, and the other 19 of which is disposed between a radial surface of said bearing surface 6a opposite the bearing 18 and a cup 20 urged towards the bearing 19, with a resilient washer 21 therebetween, by means of a nut 22 screwed on the end 1a of the shaft 1.

When the pulley 6 revolves at a low speed, the clutch is engaged since the counterweights 13 are forced by the springs 16 into the groove 15 of the planet gear wheel holder 8. The holder 8 thus rotates in synchronization with the pulley 6. The planet gear wheels 11 rotate about the crown 12 and drive the sun gear 4 and, accordingly, the shaft 1 at an overgeared rotational speed in relation to the rotational speed of the holder 8 and of the pulley 6, for example, double the rotational speed. The unidirectional coupling 7 is free wheeling.

When pulley 6 reaches a rotational speed determined by the force of the springs 16 and the weight of the counterweights 13, centrifugal forces act against the force produced by the springs 16 to cause the counterweight 13 to leave the groove 15 of the planet gear wheel 8 and the clutch is then declutched. The rotational speed of the sun gear 4 then decreases until it reaches that of pulley 6. At that moment, the rollers of the coupling 7 jam and the pulley 6 then drives the sun shaft 1 direct through the free wheel 7.

When the speed of rotation of the pulley 6 decreases until it reaches the predetermined speed, the centrifugal force no longer acts to disengage the clutch. Thus the counterweights 13 re-engage in the groove 15 of the planet gear wheel holder 8 under the action of the force exerted by the springs 16. The clutch is therefore re-engaged so that the sun gear 4 and the shaft 1 are again driven at a rotational speed which is a multiple of the rotational speed of the pulley 6.

Figure 3:
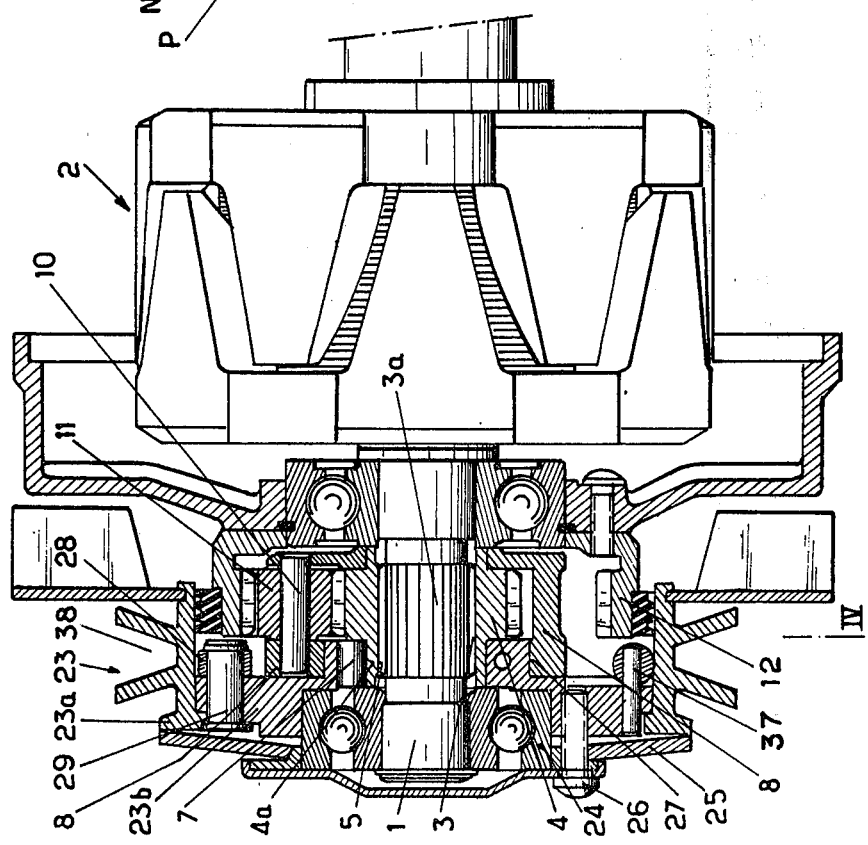

The second embodiment of the device is shown in FIGS. 3 and 4 and is generally similar to that described above with reference to FIGS. 1 and 2. In the embodiment of FIGS. 3 and 4, however, the pulley 6 is replaced by a pulley 23 formed of two elements, namely a first element 23a which has a groove 38 for the drive belt (not shown), and a second element 23b constituting a radially extending portion of the pulley by means of which it is mounted on the end of the shaft 1, a ball bearing 24 being provided between said shaft 1 and the member 23b. The members 23b and 23b are locked together by means of a resilient washer 25 which is attached to the member 23b by a screw 26, and bears against the member 23a to provide a frictional connection therebetween.

As in the embodiment described above with reference to FIGS. 1 and 2, the planetary gear train comprises a crown 12 solid with the stator of alternator 2, a sun gear 4 which is mounted by means of splines 5 on the splined end 1a of the shaft 1, and a planet gear wheel holder 8 which, in this embodiment, is mounted on a shoulder 27 of the member 23b. The free wheel 7 is located between the sleeve 4a of the sun gear 4 and the member 23b of the pulley 23.

Between the member 23b of pulley 23 and the planet gear wheel holder 8 is located a clutch formed by a positive drive coupling. This coupling comprises two levers 28 which are each mounted for pivotal movement about respective shafts 29 and which are provided at one of their ends 28a with a tooth 30 able to co-operate with an associated contact surface 31 provided on the outer circumference of the planet gear wheel holder 8. There are at least three contact surfaces 31 and the ends 28a of the levers 28 are held in engagement with a contact surface 31 by resilient means 32 acting on the opposite ends 28b of the levers. The resilient means 32 comprise, for each lever 28, a spring 33 surrounding two shafts 34a and 34b which are mounted so as to slide one in the other. The shaft 34a is pivotally mounted, by means of a shaft 36, on a fork-shaped piece 34a at the end 28b of the lever 28. The shaft 34b is pivotally mounted by means of a shaft 37 on a part 35b fixed on the member 23b.

The operation of the device of FIGS. 3 and 4 is substantially identical with that of the device described above with reference to FIGS. 1 and 2.

The member 23a of pulley 23 normally moves the member 23b by means of the washer 25. At a low speed of rotation of the pulley 23, the levers 28 mounted on the member 23b are in an engaged position and drive the planet gear wheel holder 8. Consequently, the planet gear wheels 11 drive the sun gear 4 at an over geared speed in relation to the pulley speed, for example, at double the speed, which in turn drives the input shaft 1 of the alternator 2.

Operation continues in this manner until the speed of rotation of the pulley 23 reaches a value such that levers 28, under the action of the centrifugal force, pivot about the shafts 29, to disconnect the member 23b from the planet gear wheel holder 8. The speed of the sun gear 4 then decreases until it reaches that of the pulley when the rollers of the free wheel 7 jam permitting the drive of the sun gear direct by the pulley 23, at the rotational speed of the pulley 23.

When the speed of pulley 23 decreases until it reaches the predetermined value, the levers 28, under the action of a weaker centrifugal force, are brought back to their position for engagement by the resilient means 32. Then relative rotation may take place between the members 23a and 23b of the pulley 23 to prevent shock due to the re-engagement of the levers 28 in the notches 31 of the planet gear wheel holder 8 which is halted.

The resilient means 32, as a consequence of the way in which they are arranged, have a tumbler effect.

Indeed, at the time of the disengagement between the levers 28 and the contact surfaces 31, the extremities 28b of the levers 28 move towards the inside of the pulley, tending to align the centres of the shafts 29, 36 and 37, which is resisted by the parts, while, on re-engagement, the centre of the shaft 36 moves away from this alignment, which assists movement of the parts.

Furthermore, each tooth 30 has a slope (P) which forms with a perpendicular (N) to a straight line (D) joining the centre of the shaft 29 with the centre point (M) of the contact surface (30d), an angle α smaller than the friction angle between the two surfaces. Thus, on disengagement, the two levers 28 have a friction torque to overcome.

Thus, by choice both of the characteristics of the springs 33 and of the angle α, the disengagement of the levers 28 may be effected at a rotational speed (e.g. 3000 r.p.m.) greater than the speed (2500 r.p.m.) where re-engagement takes place. In this way, any risk of hunting by the levers is done away with, as a result of the substantial difference between the speeds at which disengagement and re-engagement take place.

It is evident that the present invention is not to be regarded as limited to the embodiments described and represented but, on the contrary, covers all the alternatives thereof.

I claim:

1. A driving device for motor vehicle accessories comprising:
   a driving member;

a driven member;
a crown gear fixed against rotation;
a sun gear fixed on the driven member;
a planet gear holder capable of rotation relative to the driving member and the sun gear;
at least two planet gears rotatably mounted on said holder and meshing with both said crown gear and said sun gear;
a unidirectional coupling between the driving and driven members; and
a centrifugal clutch between said driving member and said holder, said centrifugal clutch comprising a plurality of spaced-apart pivoting members pivotally secured to said driving member and having free ends engageable with a contact surface of said holder, and respective springs acting upon said pivoting members and urging same into engagement with said contact surface, whereby at rotational speeds of the driving member below a predetermined rotational speed determined by the centrifugal clutch, said pivoting members engage said holder to transmit drive from the driving member to the driven member through said planet gears and said sun gear to rotate the driven member by higher speed than the driving member and at a rotational speed of the driving member above said predetermined rotational speed, said pivoting members are disengaged from said holder to permit direct transmission of drive from said driving member to the driven member through the unidirectional couplings.

2. A driving device for motor vehicle accessories and comprising
a driving member,
a driven member,
a crown gear fixed against rotation,
a sun gear fixedly mounted on the driven member,
a planet gear wheel holder capable of rotation relatively to the driving member and the sun gear,
at least two planet gear wheels rotatably mounted on the planet gear wheel holder and in meshing engagement with the crown gear wheel and the sun gear,
a unidirectional coupling between the driving and driven members,
a centrifugal clutch arranged between the driving member and the planet gear wheel holder,
whereby, at rotational speeds of the driving member below a predetermined rotational speed determined by the centrifugal clutch, the clutch engages the planet gear wheel holder to transmit drive from the driving member to the driven member through the at least two planet gear wheels and the sun gear to rotate the driven member at a higher rotational speed than the driving member and, at rotational speeds of the driving member above said predetermined rotational speed, the clutch disengages to permit direct transmission of drive from the driving member to the driven member through the unidirectional coupling to rotate the driven member at the same rotational speed as the driving member, the driving member comprising a pulley formed of two elements, a first of the two elements including a channel of the pulley by which drive is transmitted to the pulley and the second of the two elements forming a radially extending portion of the pulley, the two elements being connected by a resilient member fixed on one of the elements and in frictional engagement with the other element to permit relative rotation between the elements when the frictional force is overcome, the clutch being formed by a coupling with positive drive between the second element and the planet gear wheel holder, the unidirectional coupling being disposed between said second element and the sun gear.

3. A device according to claim 2 wherein the unidirectional member comprises a free-wheel with rollers movable between locked and unlocked positions.

4. A device according to claim 2 wherein the positive drive coupling comprises at least one lever pivotably mounted on a shaft solid with the second element, one end of said at least one lever being provided with a tooth co-operating with contact surfaces provided on the outer circumference of the planet gear wheel holder, said at least one lever being urged towards a position in which the tooth engages a notch by resilient means acting at an end of the at least one lever opposite to said one end.

5. A device according to claim 2 wherein the positive drive coupling comprises at least one lever pivotably mounted on a shaft solid with the second element, one end of said at least one lever being provided with a tooth co-operating with contact surfaces provided on the outer circumference of the planet gear wheel holder, said at least one lever being urged towards a position in which the tooth engages a notch by resilient means acting at an end of the at least one lever opposite to said one end and wherein the or each tooth has a slope (P) forming with a perpendicular (N) to a straight line (D) joining the centre of the shaft to the centre point (M) of a contact surface engaged by the tooth, an angle $\alpha$ which is lower than the friction angle between the engaging surfaces of the tooth and the contact surface.

* * * * *